(12) United States Patent
Chen

(10) Patent No.: US 6,829,775 B2
(45) Date of Patent: Dec. 7, 2004

(54) PROTECTING DEVICE FOR CD-ROM DRIVE

(75) Inventor: Li Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 131 days.

(21) Appl. No.: 10/324,595

(22) Filed: Dec. 18, 2002

(65) Prior Publication Data

US 2004/0052192 A1 Mar. 18, 2004

(30) Foreign Application Priority Data

Sep. 17, 2002 (TW) ...................................... 91214614 U

(51) Int. Cl.⁷ .......................... G11B 33/12; G11B 17/03
(52) U.S. Cl. ...................................... 720/652; 720/601
(58) Field of Search ............................. 369/75.1, 75.2, 369/77.1, 77.2; 361/685

(56) References Cited

U.S. PATENT DOCUMENTS

2001/0026520 A1 * 10/2001 Watanabe et al. .......... 369/75.2
2003/0235031 A1 * 12/2003 Lo .............................. 361/685

* cited by examiner

Primary Examiner—David Davis
(74) Attorney, Agent, or Firm—Wei Te Chung

(57) ABSTRACT

A protecting device (30) for a slim CD-ROM drive (10) includes a first sidewall (32), a second sidewall (34), an internal sidewall (38), and a bottom wall (36) connecting the second sidewall and the internal sidewall. A plurality of through holes (32a, 38a) is defined in the first sidewall and the internal sidewall respectively. A pair of slots (34a) is defined in the second sidewall, for providing access to the holes of the internal sidewall. A plurality of fasteners (39) is extended through respective openings and holes to attach the protecting device to a second side surface (17) and a first side surface (18) of the slim CD-ROM drive.

9 Claims, 9 Drawing Sheets

PROTECTING DEVICE FOR CD-ROM DRIVE

BACKGROUND OF THE INVENTION

1. Field of the Invention

The present invention relates to protecting devices for electronic apparatus, and more particularly to protecting devices for slim CD-ROM drives.

2. Description of the Related Art

With the trend toward miniaturization of personal computers (PCs), components of PCs have correspondingly become smaller and thinner. A typical slim CD-ROM drive comprises a main portion and a recessed portion outwardly extending from one side of the main portion. The recessed portion is thinner than the main portion, and is liable to bend or even fracture when subjected to shock or vibration. In addition, it is difficult to use screws or rails to attach the slim CD-ROM drive to a computer enclosure, due to the non-uniform shape of the slim CD-ROM drive.

SUMMARY OF THE INVENTION

Accordingly, an object of the present invention is to provide a protecting device which strengthens a slim CD-ROM drive.

Another object of the present invention is to provide a protecting device which enables a slim CD-ROM drive to be easily attached to a computer enclosure.

To achieve the above objects, a protecting device for a slim CD-ROM drive in accordance with the present invention comprises a first sidewall, a second sidewall, an internal sidewall, and a bottom wall connecting the second sidewall and the internal sidewall. A plurality of through holes is defined in the first sidewall and the internal sidewall respectively. A pair of slots is defined in the second sidewall, for providing access to the holes of the internal sidewall. A plurality of fasteners is extended through respective openings and holes to attach the protecting device to a second side surface and a first side surface of the CD-ROM drive.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
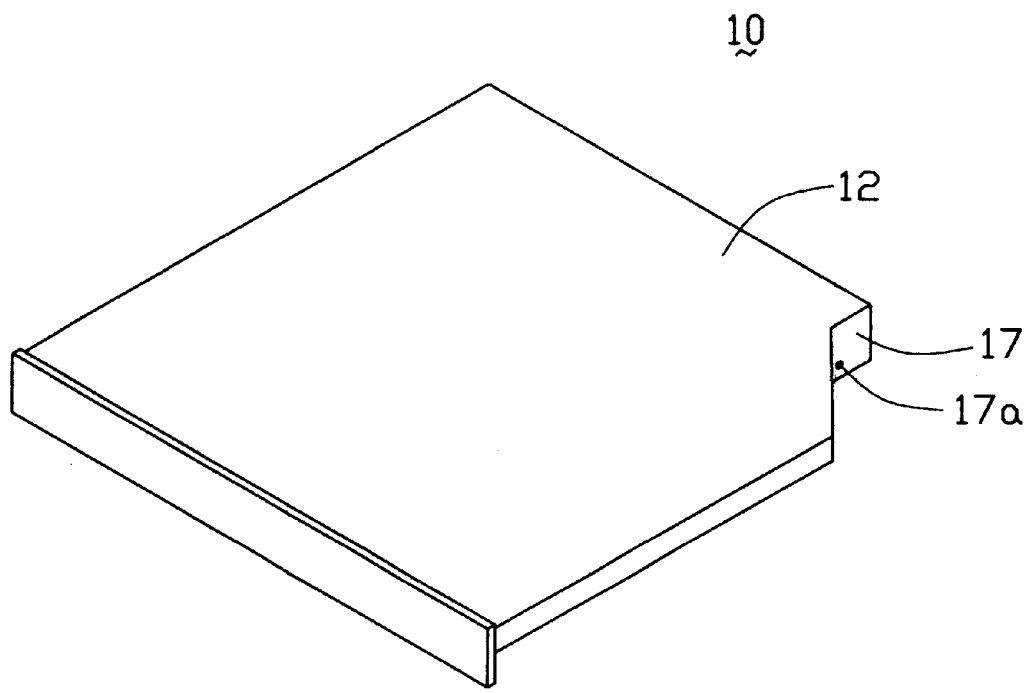
FIG. 1 is an isometric view of a slim CD-ROM drive.
Figure 2:
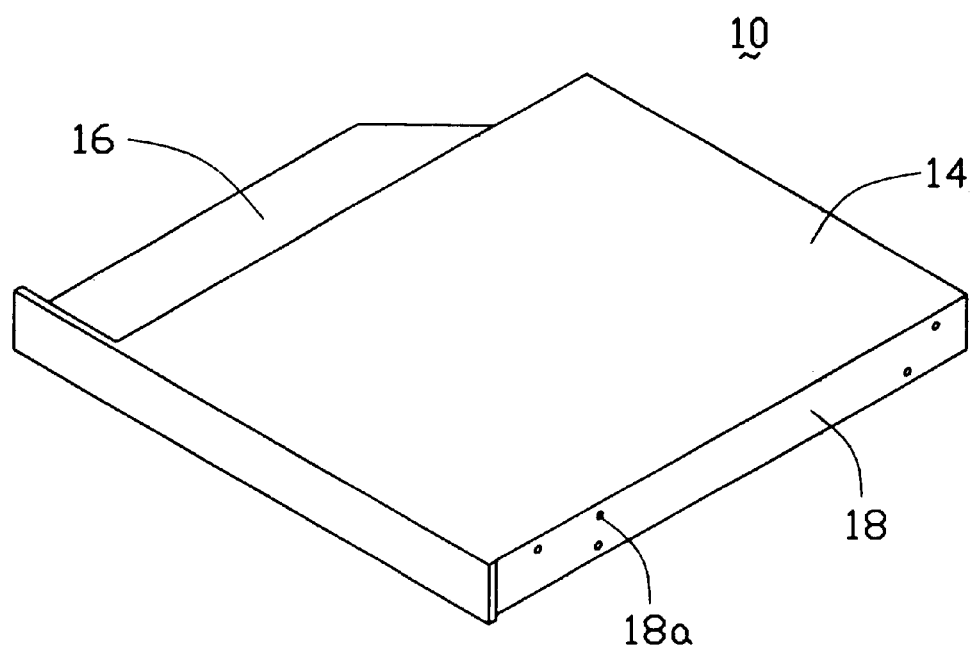
FIG. 2 is an inverted, isometric view of the slim CD-ROM drive of FIG. 1.
Figure 3:
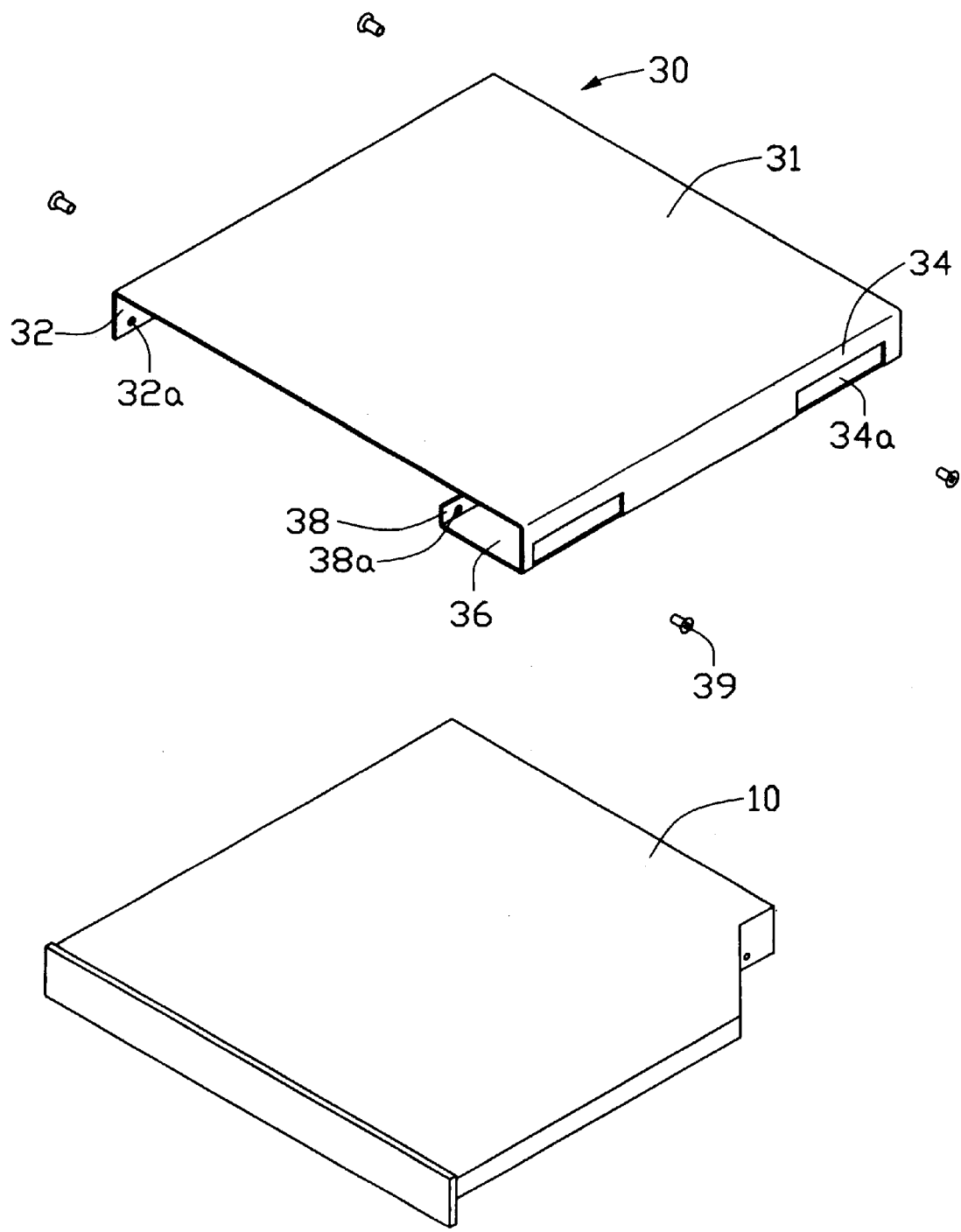
FIG. 3 is an exploded, isometric view of a protecting device in accordance with a preferred embodiment of the present invention, together with the slim CD-ROM drive of FIG. 1.
Figure 4:
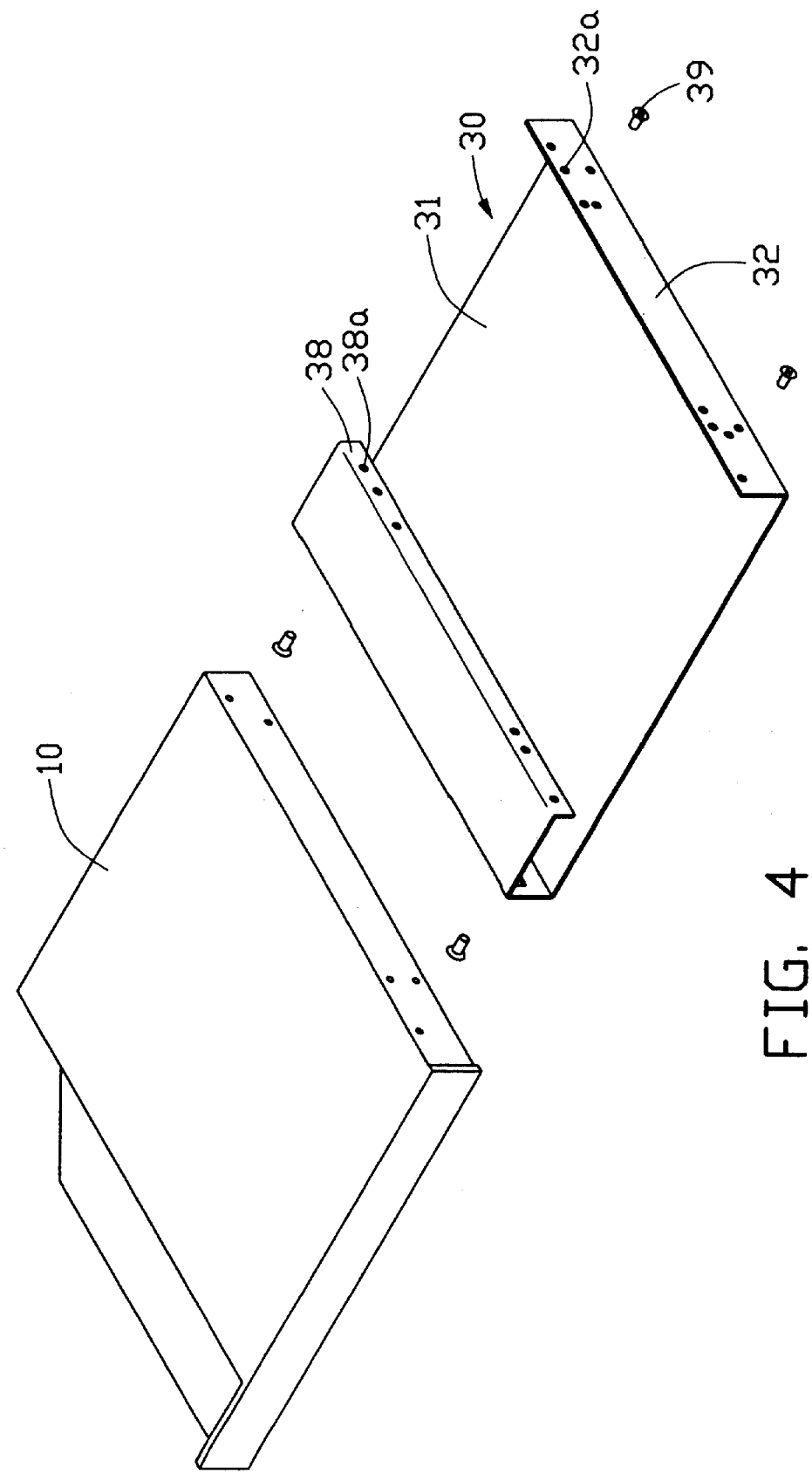
FIG. 4 is an inverted, exploded isometric view of the protecting device and slim CD-ROM drive of FIG. 3.

Referring to FIGS. 1 to 4, a protecting device 30 in accordance with a preferred embodiment of the present invention is provided for protecting a slim CD-ROM drive 10.

The slim CD-ROM drive 10 comprises a main portion (not labeled) and a recessed portion 16. The main portion comprises a top surface 12, a bottom surface 14, a first side surface 18, and a second side surface 17. The recessed portion 16 extends from the second side surface 17, such that a top surface of the recessed portion 16 is part of the top surface 12. A trapezoidal cutout (not labeled) is defined in one end of the recessed portion 16. A plurality of threaded holes 17a is defined in each of opposite ends of the second side surface 17. A plurality of threaded holes 18a is defined in each of opposite ends of the first side surface 18.

The protecting device 30 comprises a top wall 31, a first sidewall 32, a second sidewall 34, and a bottom wall 36 extending from the second sidewall 34. A plurality of through holes 32a is defined in the first sidewall 32, corresponding to the threaded holes 18a of the slim CD-ROM drive 10. A pair of spaced slots 34a is defined in the second sidewall 34 adjacent the bottom wall 36. A width of the bottom wall 36 is substantially equal to a corresponding width of the recessed portion 16. An internal sidewall 38 extends upwardly from a distal edge of the bottom wall 36. The internal sidewall 38 is parallel to the second sidewall 34. A height of the internal sidewall 38 is substantially equal to a corresponding height of the second side surface 17 of the CD-ROM drive 10. A plurality of through holes 38a is defined in the internal sidewall 38, corresponding to the threaded holes 17a respectively of the CD-ROM drive 10. A plurality of screws 39 is inserted through the through holes 32a, 38a respectively, for attaching the protecting device 30 to the slim CD-ROM drive 10.

Figure 5:
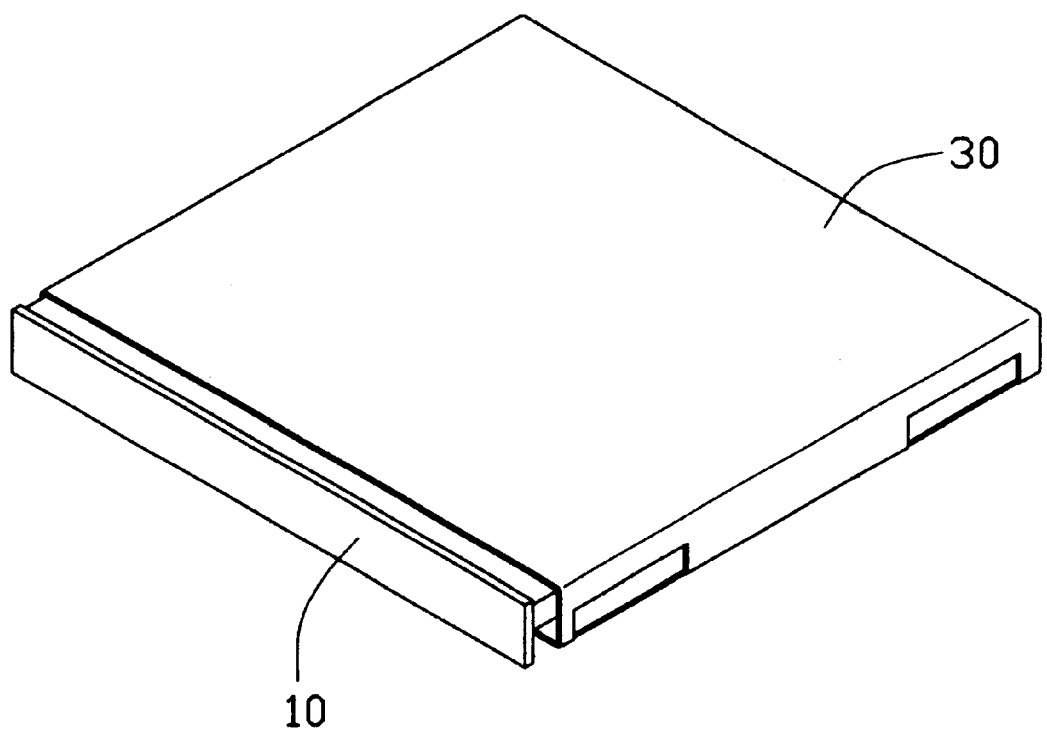
FIG. 5 is an assembled view of FIG. 3.
Figure 6:
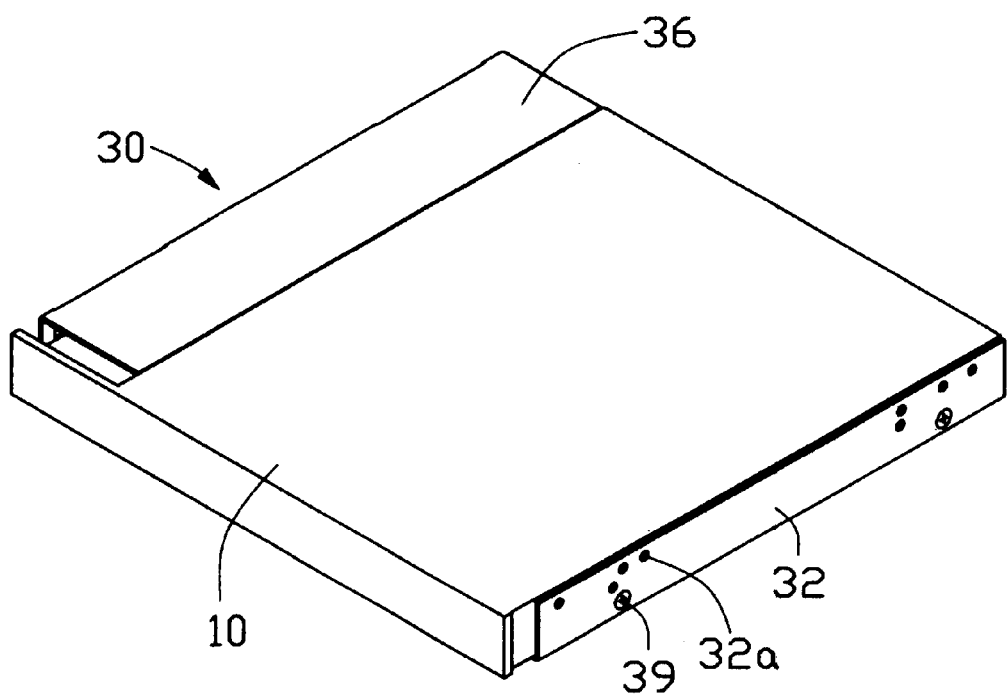
FIG. 6 is an inverted, isometric view of the assembly of FIG. 5.
Figure 7:
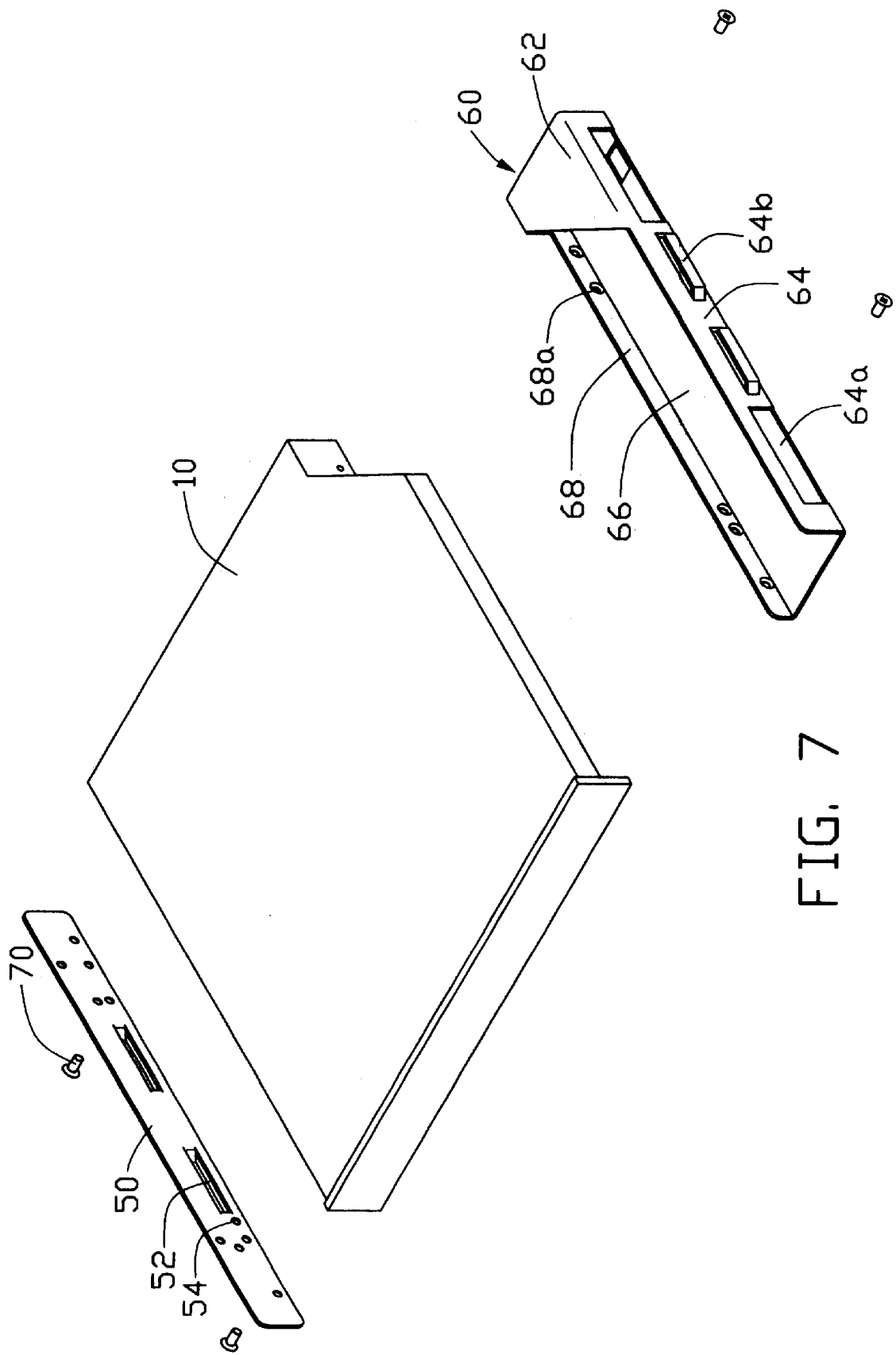
FIG. 7 is an exploded, isometric view of a protecting device in accordance with an alternative embodiment of the present invention, together with the slim CD-ROM drive of FIG. 1.
Figure 8:
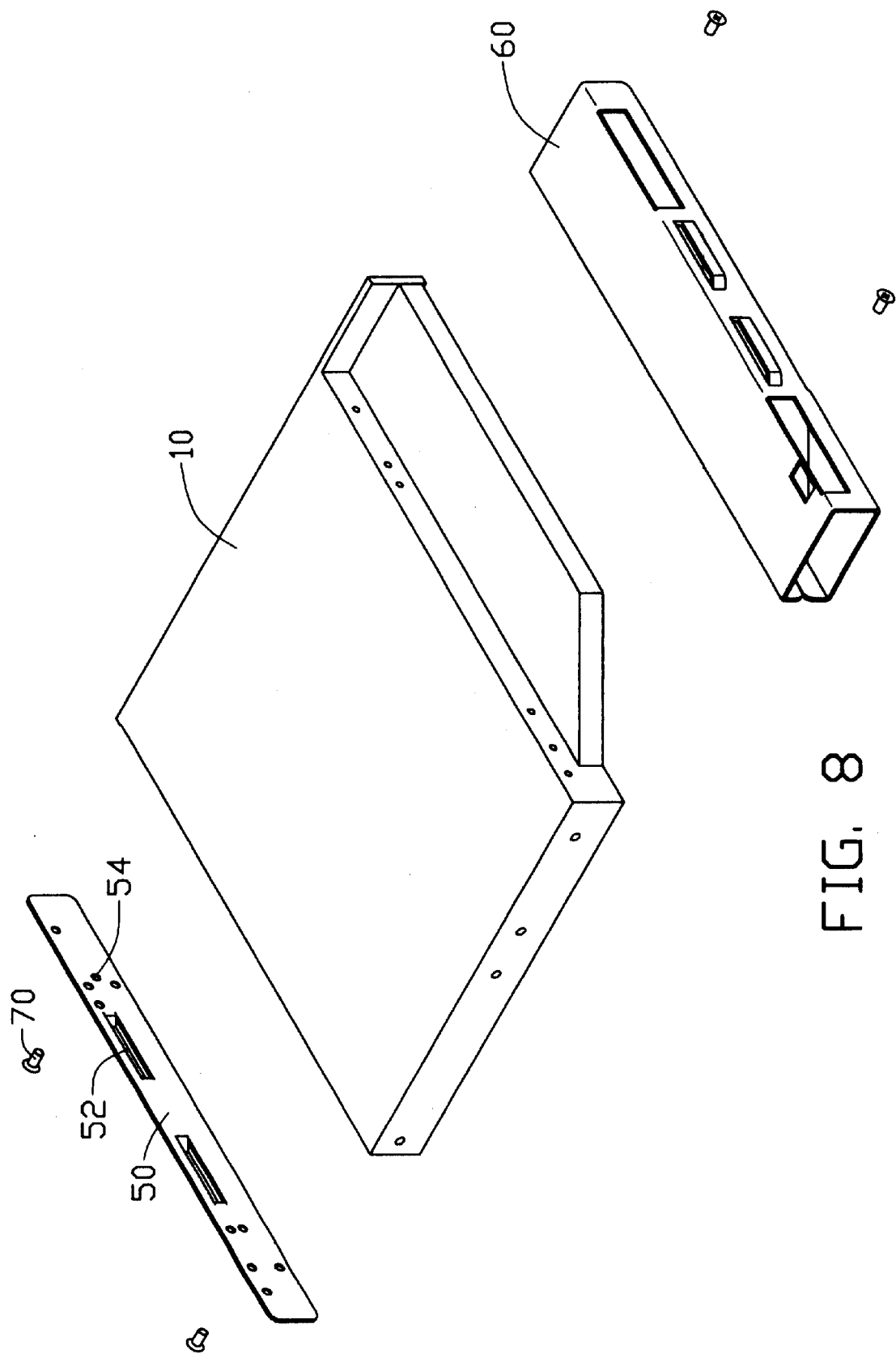
FIG. 8 is an inverted, isometric view of the protecting device and slim CD-ROM drive of FIG. 7.
Figure 9:
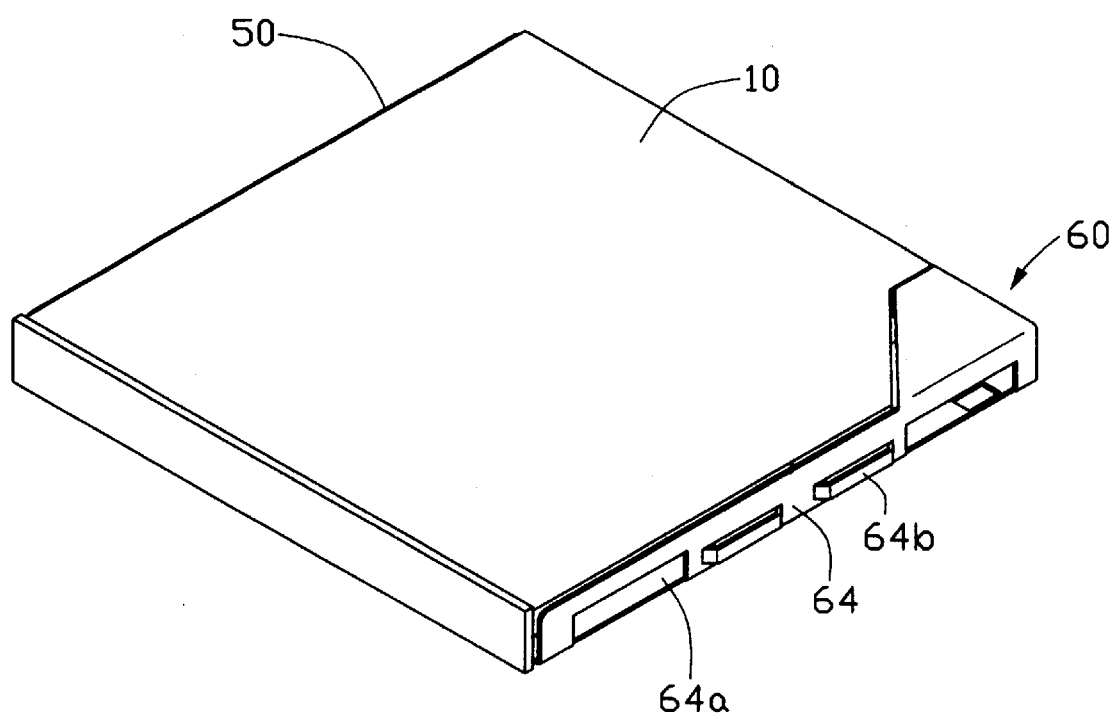
FIG. 9 is an assembled view of FIG. 7.
Figure 10:
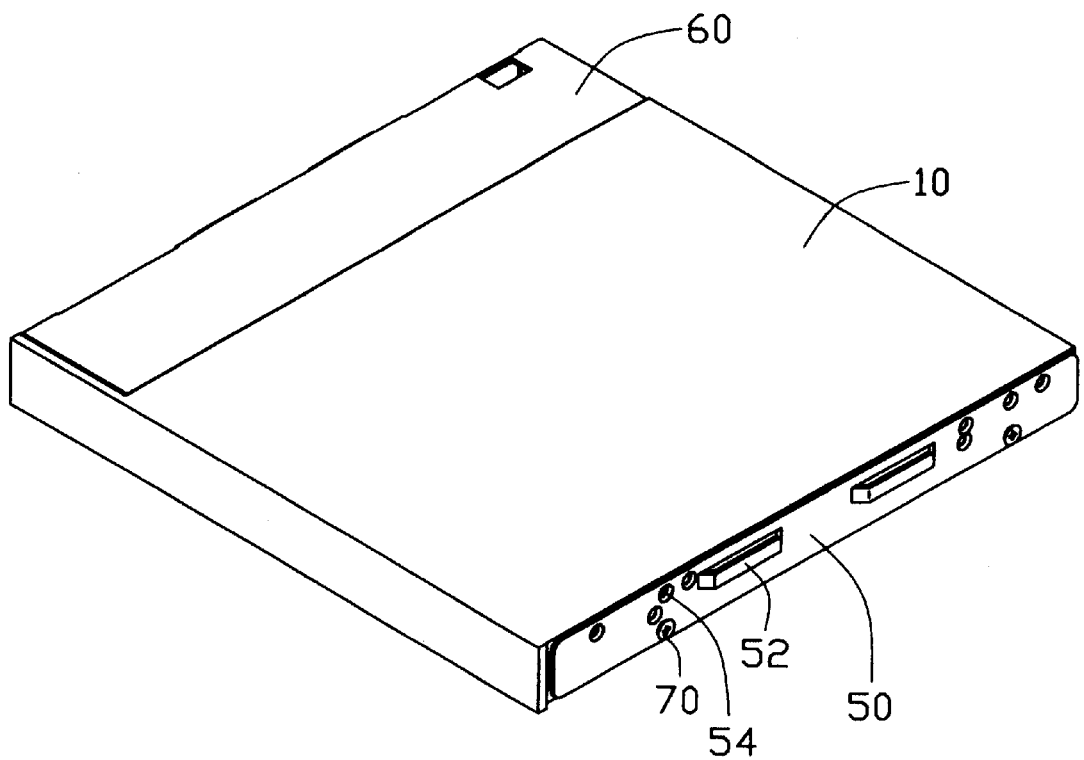
FIG. 10 is an inverted, isometric view of the assembly of FIG. 9.

Referring to FIGS. 5 and 6, in assembly, the slim CD-ROM drive 10 is inserted into the protecting device 30. The first sidewall 32 abuts the first side surface 18, the internal sidewall 38 abuts the second side surface 17, and the top wall 31 abuts the top surface 12. A plurality of screws 39 is extended through the through holes 32a and engaged in the threaded holes 18a respectively, thereby fastening the first sidewall 32 to the first side surface 18. A plurality of screws 39 is extended through the slots 34a and the through holes 38a and engaged in the threaded holes 17a respectively, thereby fastening the internal sidewall 38 to the second side surface 17. The protecting device 30 is thus securely attached on the slim CD-ROM drive 10. The combined protecting device 30 and slim CD-ROM drive 10 can be attached to a computer enclosure (not shown) with screws.

Referring to FIGS. 7 to 10, a protecting device in accordance with an alternative embodiment of the present invention comprises a main body 60 and a first sidewall 50. A pair of aligned rails 52 is outwardly formed on the first sidewall 50. A plurality of through holes 54 is defined in each of opposite ends of the first sidewall 50, corresponding to the threaded holes 18a of the slim CD-ROM drive 10. The main body 60 comprises a second sidewall 64, an internal sidewall 68, and a bottom wall 66 connecting between the second sidewall 64 and the internal sidewall 68. The internal sidewall 68 is parallel to the second sidewall 64, and a height of the internal sidewall 68 is substantially equal to the height of the second side surface 17. A plurality of through holes 68a is defined in the internal sidewall 68, corresponding to the threaded holes 17a respectively of the slim CD-ROM drive 10. A slot 64a is defined at each end of the second sidewall 64, for exposing the through holes 68a to an outside of the protecting device. A pair of aligned rails 64b is outwardly formed on the second sidewall 64 between the slots 64a. A bent plate 62 extends perpendicularly inwardly from an upper edge of the second sidewall 64 and then downwardly to adjoin the internal sidewall 68. A profile of the bent plate 62 is L-shaped, and the bent plate 62 is dimensioned to correspond to the cutout (not labeled) of the CD-ROM drive 10. A width of the bottom wall 66 is substantially equal to the width of the recessed portion 16 of the slim CD-ROM drive 10. A plurality of screws 70 is provided for attaching the protecting device to the slim CD-ROM drive 10. Assembly of the protecting device with the slim CD-ROM drive 10 is similar to the above-described assembly regarding the protecting device 30 of the preferred embodiment of the present invention.

The protecting device of the present invention provides enhanced overall strength for the slim CD-ROM drive 10, and enables the slim CD-ROM drive 10 to better withstand accidental shock. In addition, the protecting device gives the slim CD-ROM drive 10 uniform overall dimensions. This enables the slim CD-ROM drive 10 to be conveniently accommodated and fixed in a larger assembly such as a computer enclosure.

While the present invention has been illustrated by the description of preferred embodiments thereof, and while the preferred embodiments have been described in considerable detail, it is not intended to restrict or in any way limit the scope of the appended claims to such detail. Additional advantages and modifications within the spirit and scope of the present invention will readily-appear to those skilled in the art. Therefore, the present invention is not limited to the specific details and illustrative examples shown and described.

What is claimed is:

1. A protecting device for a CD-ROM drive, the CD-ROM drive comprising a top surface, a bottom surface, a first side surface and a second side surface, and a recessed portion disposed adjacent the second side surface, the protecting device comprising:
    a first sidewall for being attached to the first side surface of the CD-ROM drive;
    a second sidewall opposite to the first sidewall;
    a bottom wall inwardly extending from the second sidewall for abutting the recessed portion of the CD-ROM drive; and
    an internal sidewall upwardly extending from the bottom wall for being attached to the second side surface of the CD-ROM drive;
    wherein a width of the bottom wall is substantially equal to a corresponding width of the recessed portion of the CD-ROM drive, and a height of the internal sidewall is substantially equal to a corresponding height of the second side surface of the CD-ROM drive.

2. The protecting device as claimed in claim 1, wherein a plurality of holes is defined in each of opposite ends of the first sidewall and the internal sidewall respectively, and a plurality of fasteners is provided for extension through the holes to fasten the protecting device to the CD-ROM drive.

3. The protecting device as claimed in claim 2, wherein a plurality of openings is defined in the second sidewall for extension of corresponding fasteners therethrough.

4. The protecting device as claimed in claim 3, wherein at least one rail is arranged on each of the first and second sidewalls.

5. The protecting device as claimed in claim 1, wherein a bent plate extends from the second sidewall, corresponding to a cutout of the recessed portion of the CD-ROM drive.

6. The protecting device as claimed in claim 1, wherein the protecting device further comprises a top wall integrally connecting the first sidewall and the second sidewall.

7. A CD-ROM drive assembly comprising:
    a CD-ROM drive comprising a top surface, a first side surface, a second side surface and a recessed portion disposed adjacent the second side surface; and
    a protecting device fastened to the CD-ROM drive, the protecting device comprising a first sidewall, a second sidewall, an internal sidewall and a bottom wall connecting between the second sidewall and the internal sidewall, a plurality of holes defined in the first sidewall and the internal sidewall respectively, a plurality of openings defined in the second sidewall corresponding to the holes of the internal sidewall, a plurality of fasteners extending through respective openings and holes to attach the protecting device to the first side surface and the second side surface of the CD-ROM drive.

8. The CD-ROM drive assembly as claimed in the claim 7, wherein a plurality of threaded holes is defined in the first and second side surfaces of the CD-ROM drive respectively corresponding to the holes of the first and internal sidewalls.

9. A CD-ROM drive assembly comprising:
    a CD-ROM drive comprising a top surface, a first side surface, a second side surface opposite to said first side surface, and a recessed portion located adjacent said second side surface and defining an inwardly recessed surface parallel to said second side surface; and
    a protecting device fastened to drive, said protecting device including:
    opposite first and second side walls located on outsides of and abutting against the corresponding first and second surfaces of the drive, respectively, an internal side wall being parallel to the second wall and connected to the second side wall via a bottom wall and abutting against the corresponding recessed surface; wherein
    a first set of fastening devices fixing the first surface of the drive and the first wall of the protecting device together, and a second set of fastening devices fixing the recessed surface of the drive and the internal side wall of the protecting device.

* * * * *